UNITED STATES PATENT OFFICE.

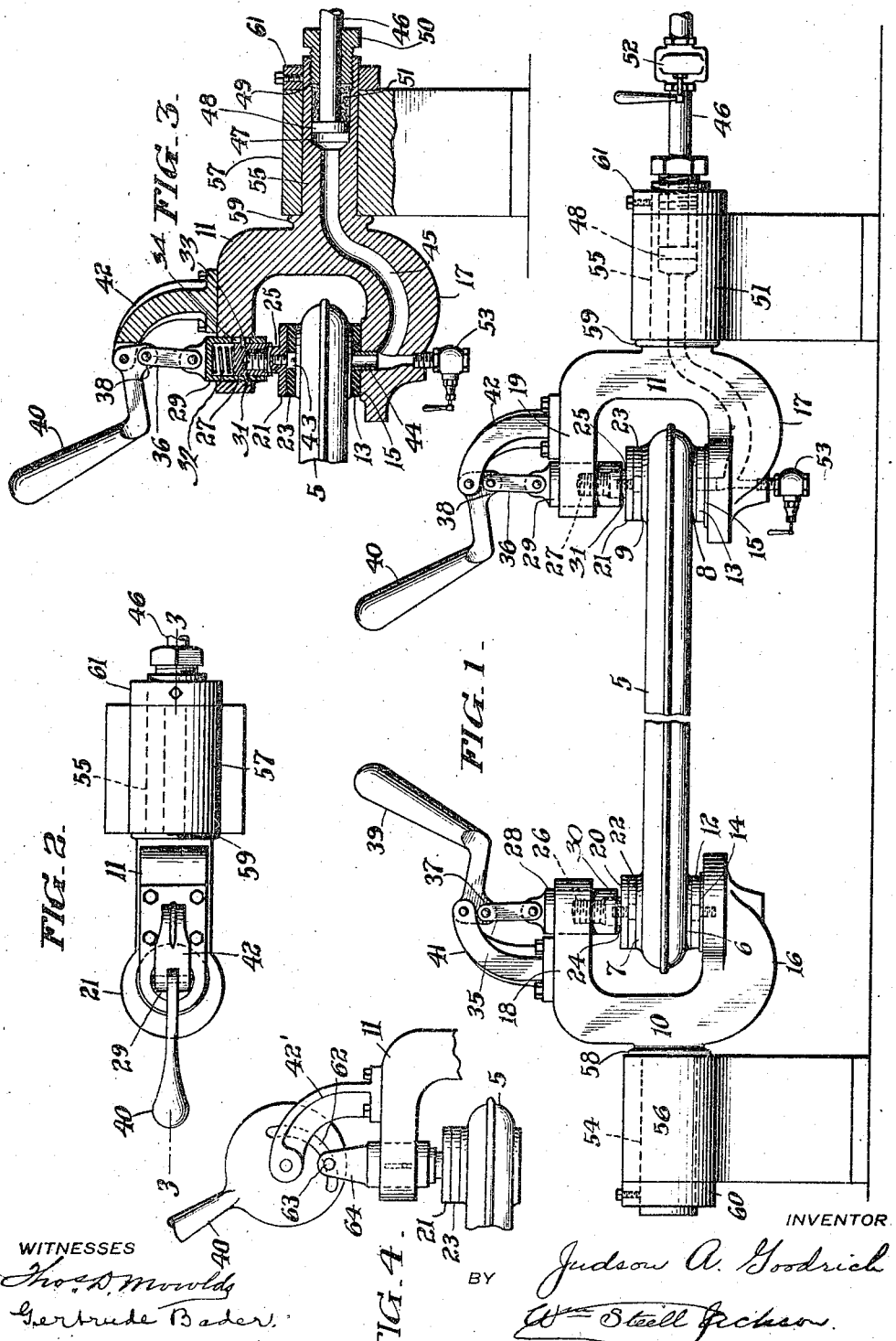

JUDSON A. GOODRICH, OF HUNTINGDON, PENNSYLVANIA.

TEST APPARATUS FOR RADIATOR-SECTIONS.

1,151,007.  Specification of Letters Patent.  Patented Aug. 24, 1915.

Application filed April 22, 1914. Serial No. 833,600.

*To all whom it may concern:*

Be it known that I, JUDSON A. GOODRICH, a citizen of the United States, residing at Huntingdon, in the county of Huntingdon and State of Pennsylvania, have invented a certain new and useful Test Apparatus for Radiator-Sections, of which the following is a specification.

The purpose of my invention is to provide rotatable radiator testing heads with quick-operating clamping mechanism for holding the sections tested.

A further purpose of my invention is to make the clamping mechanism of spaced rotatable radiator testing heads intended to engage the same section, operate by handle movement, preferably in parallel directions and most desirably toward and from each other to reduce the effort required in operating them simultaneously, increase the speed and simplify their operation.

Further purposes of my invention will appear in the specification and claims hereof.

While recognizing that my invention might be applied in many forms, I have preferred to illustrate it by but two forms thereof, both of which have proved to be simple, effective and inexpensive and which at the same time well illustrate the principles involved.

Similar numerals of reference indicate like parts.

Figure 1 is a side elevation of mechanism embodying my invention. Fig. 2 is a top plan view of the right hand clamping head seen in Fig. 1. Fig. 3 is a partial section of Fig. 1 corresponding to line 3—3 of Fig. 2. Fig. 4 is a broken side elevation, showing a second form.

Each radiator section has a boss on each side near each end, where the section is to fit against the next section of the radiator. The openings for admission of heating fluid are formed in the middle of these bosses. For hot water radiators these openings are placed at opposite sides of the same end; for steam, at opposite ends. In either event the section is ordinarily tested before the bosses have been machined by forcing water into the section through one of these openings at considerable pressure, while the other opening or openings are sealed. Faults are disclosed by the leaks which occur. Rotation of the testing apparatus while the test is being made is desirable to permit full inspection of the section being tested and quick and convenient reliable clamping and release of the sections successively tested is of great importance. Where the inlet and outlet openings in the section occur at one end only, one of the test heads performs supporting functions only.

The radiator section 5 is provided with bosses 6, 7 and 8, 9 upon opposite sides in each pair and with the pairs at opposite ends. Two at least of these faces are apertured to permit flow of heating fluid into and out of the section. If the apertures be at one end only this end is intended to be at the right in Fig. 1.

The section 5 is placed in rotatable test heads 10, 11, of general yoke or C-clamp form, with the bosses 6, 8 resting upon sealing gaskets 12, 13, preferably rubber, covering the faces 14, 15 of the lower jaws 16, 17, comprising the relatively fixed jaws of the clamps. The heads are spaced suitably to accommodate the length of sections being tested and are rotatably mounted. The upper jaws 18, 19 complete the yokes or clamps and carry relatively movable clamping plates and quick-operating means for setting and releasing them.

The clamping plates 20, 21 are gasketed at 22, 23 to seal the upper boss faces of the section tested. The plates are extended upwardly (axially) at 24, 25 and screw-threaded at 26, 27 to screw into the plungers 28, 29 or parts carried by them. The connection between the plates and plungers may thus be either rigid and fixed or adjustable to take up the wear of the gaskets or accommodate different thicknesses of section, as may best suit the wishes or needs of the user.

I prefer to interpose cushions between the upward extensions of the plates at 24 and 25 and the plungers 28, 29 without losing the adjustability by the threads 26 and 27 and, for this purpose, thread the extensions 24, 25 into heads 30, 31 slidable within the plungers 28, 29 compressing any suitable springs 32 therein. The heads are prevented from rotation by pins 33 fitting within slots 34. The lengths of the slots determine the extent of reciprocation of the heads in the plungers and limit them against accidental withdrawal.

The plungers are guided in the jaw 18, 19 and are lowered and raised to set and release the clamps by quick operating lever mechanism, one form of which, shown in the first three figures, comprises toggles made up of links 35, 36 and levers 37, 38 operated by handles 39, 40. The links are pivotally connected to the plungers at one end and to the levers at the other, and the upper ends of the levers are pivoted in brackets 41, 42 rigid with the jaws 10, 11.

The gaskets are secured to the faces 14, 20 and 21 by means of screws 43. The gasket 13, however, is secured to the face 15 by a nipple 44 which allows fluid under pressure to pass into the radiator section from passage 45. Water is ordinarily used for the test and is supplied under pressure through a pipe 46 which enters the head within recess 47 and is flanged or provided with a collar therein at 48. The outer part of the recess is interiorly screw-threaded at 49 to receive a stuffing box 50 by which the packing 51 is set against the flange 48.

Inlet of water to the passage and radiator section is permitted or checked by valve 52 and the pressure is relieved after test through valve 53.

The heads 10 and 11 are made rotatable by stub-shaft extensions 54 and 55 in the direction of the length of the spindle, these shafts having bearing in the pillows 56, 57 and being prevented from movement in either direction by the shoulders 58, 59 and the collars 60, 61, secured to the shaft in any suitable manner. The recess 47 is formed within the stub shaft 55 and is coaxial therewith.

For the purpose of illustrating that the substantially parallel movement of levers is not confined to the link construction, I have shown one other of the many other such means in Fig. 4 where the brackets 42' carry cam levers having handles 40 and cam grooves 62 within which pins 63 are fitted. The pins are supported in the ears 64 connected with the plungers. I aim to make the slope of the cam gradual enough for it to hold the parts in their positions with the pins at any point along the length of the cam grooves, which, in connection with the cushions within the plungers, gives a much greater range of usefulness than when the lever must be thrown to the same position at all times. Wear and deterioration of the gaskets as well as deviation in the thickness of the sections between opposite boss faces are both compensated for by the range of movement of the cam and the movement of the parts within the plungers.

In operation, the valve 52 is closed at the time a section is to be inserted for test. The operating handles are at their greatest distance away from each other and the plungers are lifted. The section to be tested is rested upon the gaskets by which the surfaces of the metal of the lower jaws are faced, and which provide sealing faces. During this operation the heads 10 and 11 are located in approximately the positions shown in Fig. 1 but with the upper bosses 7 and 9 lifted to admit the section freely. The handles are then drawn toward each other forcing the plungers down. This causes the gaskets to engage the faces of the radiator sections tightly and seal them against leakage of water. The toggles of Fig. 1 throw in this direction to the locked positions shown. The cam of Fig. 5 is locked in any position. With the valve 53 closed, the valve 52 is now opened, admitting water to the section under test and the heads are oscillated or rotated to permit full examination of the section. They are then turned back to place, the valve 52 closed and the valve 53 opened to release the water used. The handles are then moved away from each other to release the movable clamping plates and permit the removal of the section tested and insertion of a new section.

It will be evident that the preferred movement of the operating handles toward and away from each other, in the operation of the clamps simultaneously, lessens the effort required and adds greatly to the convenience in operation. It will be further evident that other forms of rapid clamp movement might be used with the rotatable heads shown and that various changes might be made in the construction invented by me without departing from the spirit and scope of my invention.

Having thus described my invention, what I claim as new and desire to secure by Letters Patent, is:

1. In a testing device for radiator sections, rotatable heads adapted to support opposite ends of the section to be tested, having engaging members fixed and movable relatively with respect to each of said heads for engaging the section and one provided with passages for testing fluid, in combination with quick operating means for moving the movable members.

2. In a testing device for radiator sections, rotatable heads adapted to support opposite ends of the section to be tested, having members upon each head fixed and movable relatively with respect to said head for engaging the section, one of the members being provided with a passage for testing fluid and quick operating means for clamping the movable members, operated by the attendant in opposite directions to release the two movable members.

3. In a testing device for radiator sections, rotatable heads for support of opposite ends of the radiator sections, means for introducing and exhausting fluid pressure to one of said heads, said heads being each provided with two engaging members, the one fixed and the other movable, with respect to said heads and quick operating mechanism for the movable members operated in reverse direction at the two ends of the section.

4. In a testing device for radiator sections, a pair of facing rotatable yokes, having engaging members terminating in sealing faces on opposite sides of said yokes, one of the members and yokes having a fluid passage, quick operating means for moving one of the members in each yoke toward the other and maintaining it in fixed position with respect thereto and means for applying and releasing fluid pressure to and from said passage.

5. In a testing device for radiator sections, a plurality of rotatable testing heads terminating in yokes, one of the yokes being provided with a fluid passage on one side thereof, opposing engaging members terminating in sealing faces on opposite sides of said yokes adapted to engage the radiator section and one of said members having a passage connected with the fluid passage of the yoke, a plunger adapted to guide movement of one of said members in each of said yokes toward and from the other, means for applying and releasing fluid pressure to and from the passage and quick throw mechanism for moving said plungers and locking them in set position.

6. In a testing device for radiator sections, a plurality of rotatable testing heads terminating in yokes, one of the yokes being provided with a fluid passage on one side thereof, opposing engaging members terminating in sealing faces on opposite sides of said yoke adapted to engage the radiator section and one of said members having a passage connected with the fluid passage of the yoke, plungers adapted to guide movements of one of said members in each of said yokes toward and from the other, means for applying and releasing fluid pressure to and from the passage, links connected with the plungers, brackets and connections between the links and brackets terminating in handles movable toward or from each other for the same direction of plunger movement.

7. In a testing device for radiator sections, a plurality of rotatable testing heads terminating in yokes, one of the yokes being provided with a fluid passage on one side thereof, opposing engaging members terminating in sealing faces on opposite sides of said yoke adapted to engage the radiator section and one of said members having a passage connected with the fluid passage of the yoke, plungers adapted to guide movements of one of said members in each of said yokes, toward and from the other, means for applying and releasing fluid pressure to and from the passage and cams and supports therefor engaging the plungers to move them.

8. In a testing device for radiator sections, a plurality of rotatable testing heads terminating in yokes, one of the yokes being provided with a fluid passage on one side thereof, opposing engaging members terminating in sealing faces on opposite sides of said yoke adapted to engage the radiator section and one of said members having a passage connected with the fluid passage of the yoke, plungers adapted to guide movements of one of said members in each of said yokes toward and from the other, means for applying and releasing fluid pressure to and from the passage, two cams, one connected with each of the plungers and locking them in varying positions and operating means for said cams having parallel substantially straight line movement.

9. In a testing device for radiator sections, a plurality of rotatable testing heads terminating in yokes, one of the yokes being provided with a fluid passage on one side thereof opposing engaging members terminating in sealing faces on opposite sides of said yoke adapted to engage the radiator section and one of said members having a passage connected with the fluid passage of the yoke, plungers adapted to guide movements of one of said members in each of said yokes toward and from the other, means for applying and releasing fluid pressure to and from the passage, two cams, one connected with each of the plungers and locking them in varying positions and operating means for said cams.

10. In a testing device for radiator sections, a plurality of rotatable testing heads terminating in yokes, pairs of clamps terminating in engaging faces, one pair carried by each yoke and one of the yokes and clamps having a fluid passage, in combination with lever-operated means for closing and opening the clamps, the levers moving toward each other to cause the same character of movement of the two clamps.

JUDSON A. GOODRICH.

Witnesses:
WM. STEELL JACKSON,
HELEN I. KAUFFMAN GEORGE.